(12) United States Patent
Jarisch et al.

(10) Patent No.: US 9,255,819 B2
(45) Date of Patent: Feb. 9, 2016

(54) DEVICE FOR SENSING A CAPSULE IN A BEVERAGE PRODUCTION APPARATUS

(71) Applicant: NESTEC S.A., Vevey (CH)

(72) Inventors: Christian Jarisch, Lutry (CH); Stefan Kaeser, Aarau (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/450,900

(22) Filed: Aug. 4, 2014

(65) Prior Publication Data

US 2014/0340078 A1    Nov. 20, 2014

Related U.S. Application Data

(63) Continuation of application No. 13/811,111, filed as application No. PCT/EP2011/061913 on Jul. 13, 2011, now Pat. No. 8,836,956.

(30) Foreign Application Priority Data

Jul. 19, 2010    (EP) .................................... 10170042

(51) Int. Cl.
  *G01B 11/14*    (2006.01)
  *G01D 5/26*    (2006.01)
  (Continued)

(52) U.S. Cl.
  CPC ............... *G01D 5/26* (2013.01); *A47J 31/0668* (2013.01); *A47J 31/369* (2013.01); *A47J 31/52* (2013.01); *G01B 7/14* (2013.01); *G01B 11/14* (2013.01); *G01D 5/14* (2013.01)

(58) Field of Classification Search
  CPC ..... A47J 31/52; A47J 31/0668; A47J 31/369; A47J 31/407; A47J 31/402; A47J 31/46; A47J 31/41; A47J 31/4492; A47J 31/44; A47J 31/00; A47J 31/0647; A47J 31/0678; A47J 31/14; A47J 31/3676
  See application file for complete search history.

(56) References Cited

U.S. PATENT DOCUMENTS

| 2007/0104837 A1 | 5/2007 | Yoakim et al. | |
| 2008/0187638 A1* | 8/2008 | Hansen | ......................... 426/433 |

(Continued)

FOREIGN PATENT DOCUMENTS

WO    2010026053    3/2010

*Primary Examiner* — Michael P Stafira
(74) *Attorney, Agent, or Firm* — K&L Gates LLP

(57) ABSTRACT

The invention aims to provide a device sensing a capsule inserted in a receptacle in machine and physical parameters of liquid supplied by a beverage production apparatus flowing through the capsule in function of the type of capsule. The capsule containing beverage ingredient is inserted in a cylindrical or conical wide mouthed receptacle having an upper opening for inserting the capsule and a lower bottom closing the receptacle. The receptacle rotates around an axis of a hollow shaft attached at the center and perpendicularly to the external face of the bottom of the receptacle, said shaft forming a hole at the center of the inner face of the bottom of the receptacle. The device comprises a rod sliding in the shaft and passing through the hole of the inner face of the bottom of the receptacle, said rod being provided with a spring maintaining an end of the rod lifted inside the receptacle in contact with the capsule, the other end being inside the shaft. The device further comprising means for measuring the position of the end of the rod in the shaft, in order to control, in function of the size of the capsule inserted in the receptacle, rotation speed of the receptacle, discharge and physical parameters of liquid supplied by the beverage production apparatus flowing through the capsule.

11 Claims, 3 Drawing Sheets

(51) Int. Cl.
*A47J 31/06* (2006.01)
*A47J 31/36* (2006.01)
*A47J 31/52* (2006.01)
*G01B 7/14* (2006.01)
*G01D 5/14* (2006.01)

(56) References Cited

U.S. PATENT DOCUMENTS

2008/0302251 A1 * 12/2008 Rijskamp et al. ............... 99/295
2010/0147157 A1    6/2010 Tanner et al.

* cited by examiner

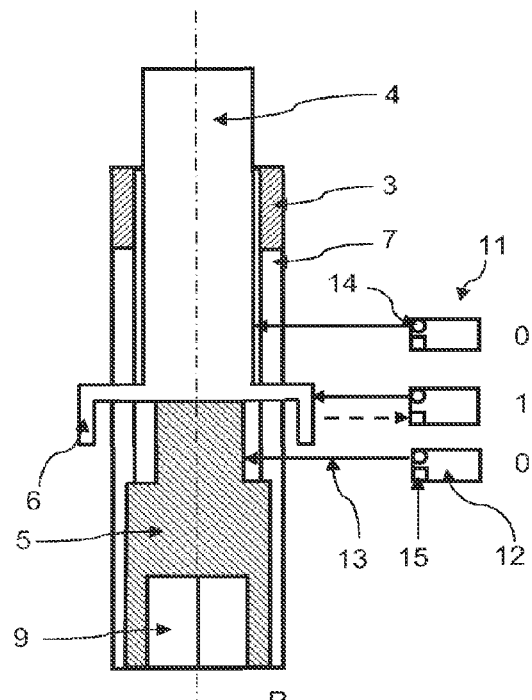
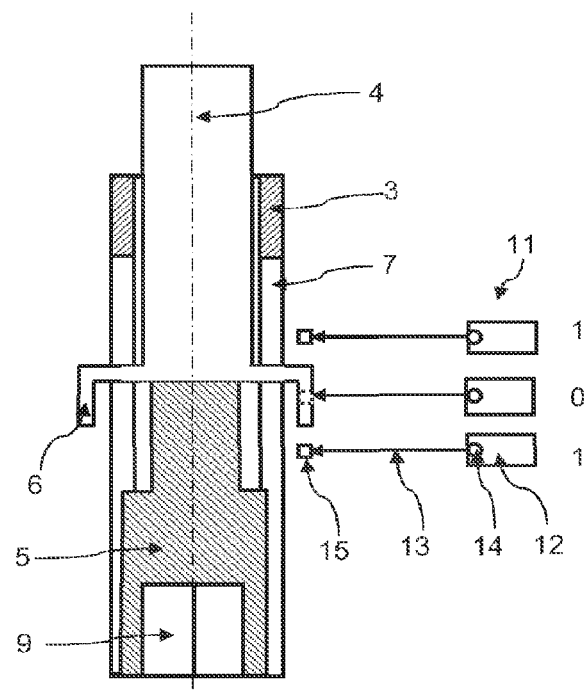
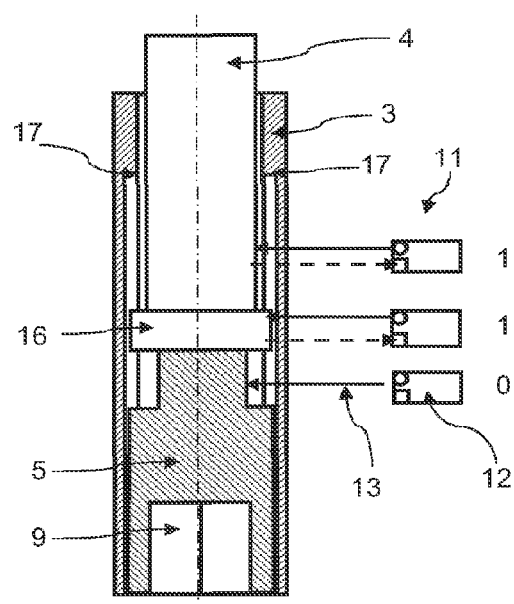
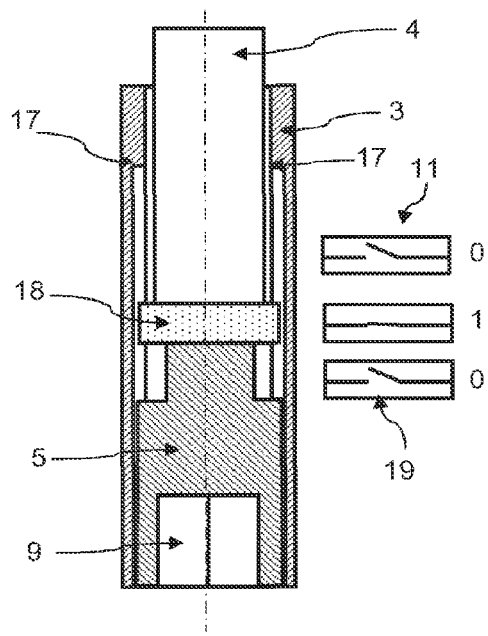

DEVICE FOR SENSING A CAPSULE IN A BEVERAGE PRODUCTION APPARATUS

CROSS REFERENCE TO RELATED APPLICATIONS

This application is a continuation of U.S. patent application Ser. No. 13/811,111, filed Jan. 18, 2013, which is a National Stage of International Application No. PCT/EP2011/061913, filed on Jul. 13, 2011, which claims priority to European Patent Application No. 10170042.5, filed Jul. 19, 2010, the entire contents of which are being incorporated herein by reference.

BACKGROUND

The invention relates to a sensing device associated to a beverage production apparatus for preparing a beverage by use of a capsule containing beverage ingredient.

TECHNICAL BACKGROUND

The preparation of a beverage by a capsule containing beverage ingredient is known. In general, the capsule is inserted in a beverage production device, such as a coffee machine, liquid is fed in the capsule and a beverage is extracted from the capsule under pressure or by gravity.

The preparation of a beverage by using the centrifugation is known. The principle mainly consists in providing a beverage ingredient in a container of the capsule, feeding liquid in the receptacle and rotating the receptacle at elevated speed to ensure interaction of liquid with powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

The term "capsule" refers to any flexible, rigid or semi-rigid container containing beverage ingredient. Other synonymous to a capsule are: "pod", "pad", "cartridge" or "sachet". The capsule can be single use. The container can also be filled with ingredient by the user to form the capsule just before use.

The term ingredient means any suitable beverage substance such as ground coffee, soluble coffee, leaf tea, soluble tea, herbal tea, dairy powder, culinary powder, baby food and combination thereof.

It exists systems for identifying a capsule in a beverage production device using mechanical, optical or magnetic sensors. However, in general, these systems require a specific marker on the capsule such as mechanical indicia, a barcode or magnetic label to enable differentiating one capsule from another. Providing such marker leads to technical constraints on the capsule and is costly. Furthermore, certain markers on the capsule are sensitive to the steam or liquid environment that surrounds the capsule. Therefore, a reliable reading of the marker is not always assured. WO2010/026053 relates to a controlled beverage production device using centrifugal forces. The capsule may comprise a barcode provided on an outside face of the capsule and which enables a detection of the type of capsule and/or the nature of ingredients provided within the capsule in order to apply a predefined extraction profile for the beverage to be prepared.

SUMMARY

The aim of the invention is to provide a device for sensing a capsule inserted in a receptacle in a simpler and more effective manner in order to reliably control operational brewing parameters such as the discharge and physical parameters of liquid supplied in the beverage production apparatus. In particular, the invention requires using no particular traditional markers or indicia on the capsule such as a typical barcode, magnetic tag or other recognition means thereby making the capsule much more economical and preventing the risk of malfunctioning in the brewing conditions.

This aim is achieved by a device for sensing a capsule in a beverage production apparatus, comprising a receptacle for receiving said capsule containing beverage ingredient, said receptacle having an upper opening for inserting the capsule and a bottom, the device is characterized in that it comprises at least one means for sensing the relative position of an external surface of the capsule in the receptacle; said position being representative of the size of the receptacle when the capsule is arranged in the receptacle and means for providing a code which is related to the sensed relative position of said surface.

In general, the sensing means preferably comprise a retractable sensing plunger arranged to sense the position of the bottom of the capsule.

The means for providing a code preferably comprise an optical measuring means or a magnetic sensor for determining the relative position of the sensing means and providing a binary code.

In the preferred mode, the receptacle is arranged to rotate around an axis perpendicular to the bottom of the receptacle.

The sensing device provides a code to the beverage production apparatus that may be used to control the operational brewing parameters of the beverage production apparatus.

The operational parameters may comprise the rotation speed of the receptacle and/or the discharge and physical parameters of liquid supplied in the capsule and flowing therethrough. Such discharge and physical parameters may include the flow rate, the volume, the heating temperature of the supplied liquid and combinations thereof.

More particularly, the sensing means comprises a rod sliding along a shaft coaxial to the rotation axis and passing through a hole of the inner face of the bottom of the receptacle, said rod being provided with a spring maintaining an end of the rod lifted inside the receptacle, said device further comprising means for measuring the position of the end of the rod sliding along the shaft.

According to a configuration of the device, the shaft is attached to the receptacle perpendicularly at the center of the bottom external face. The rod may be divided in several parts passing each through a hole near the center of the receptacle. After traversing the hole, each part of the rod slides outside along the shaft in function of the size of the capsule inserted in the receptacle. The position of the end of each part along the shaft is determined by the measuring means. This configuration could present a drawback regarding water tightness between the interior and the exterior of the receptacle because of possible leakage of liquid through the holes where the parts of the rod are passing.

To overcome this possible drawback and to make easier the manufacturing process, a preferred configuration comprises a receptacle rotating around an axis of a cylindrical hollow shaft attached at the center and perpendicularly to the external face of the bottom of the receptacle. The shaft forms a hole at the center of the inner face of the bottom of the receptacle. The device comprises a rod sliding in the shaft and passing through the hole of the inner face of the bottom of the receptacle. The rod is provided with a spring maintaining an end of the rod lifted inside the receptacle in contact with the capsule, the other end slides inside the shaft at positions depending on the size of the capsule. This solution including a rod in one part sliding inside the shaft instead of outside the shaft is thus better adapted for rendering the receptacle watertight with one packing gland only around the rod below the hole of the receptacle.

The capsules are available in different sizes depending on their content and the type of beverage to be produced. The position of the ends of the rod varies with the size of the capsule inserted in the receptacle. A large capsule occupying almost the whole volume of the receptacle will push the rod towards the bottom of the receptacle while the position of the end in the shaft is the most distant from the bottom of the receptacle. Contrarily, a small capsule pushes the rod on a short distance in the shaft so that the end is closer to the bottom of the receptacle.

When the receptacle is empty, the rod has a neutral position where the end of the rod inside the receptacle is lifted at the highest position close to the upper opening. The other end of the rod sliding in the shaft is then close to the bottom of the receptacle. The spring maintaining the rod lifted is therefore entirely released.

The position of the end of the rod in the shaft is measured by optical or magnetic means having no electrical contact with the rod which rotates together with the receptacle once the capsule is inserted therein to start the apparatus producing beverage.

In another possible embodiment, the means for providing a code related to the sensed relative position of said surface, comprises a potentiometer for measuring variable resistances as a function of the relative position of the rod.

BRIEF DESCRIPTION OF THE DRAWINGS

The invention will be better understood thanks to the following detailed description which refers to the enclosed drawings given as non limitative examples.

FIG. 5 shows a schematic view of optical sensing means based on reflection/absorption of a light beam on a member of the rod passing through a slot in the shaft.

FIG. 6 shows a schematic view of optical sensing means based on light barriers where light beams are interrupted or not by a member of the rod.

FIG. 7 shows a schematic view of optical sensing means based on reflection/absorption of a light beam by the rod through a transparent portion of the shaft.

FIG. 8 shows a schematic view of magnetic sensing means based on reed relays which are switched on or off by a permanent magnet attached on the end of the rod sliding in the shaft.

DETAILED DESCRIPTION

Figure 1:
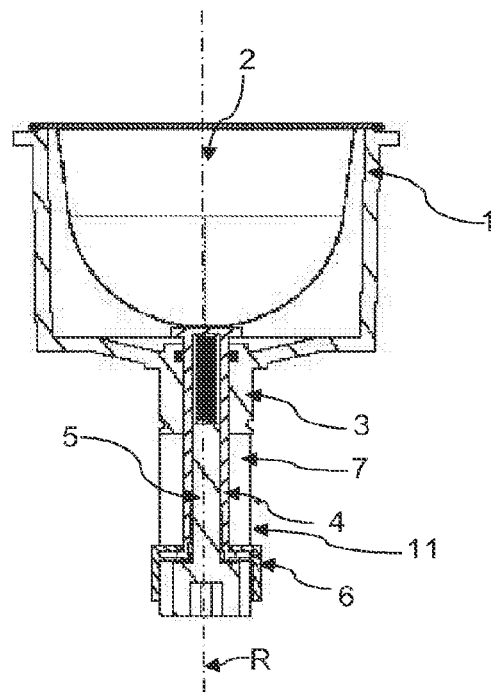
FIG. 1 shows a receptacle containing a large size capsule where the rod of the device for sensing the capsule is at the lowest position inside the receptacle.

The FIGS. 1 to 4 illustrate an example of a capsule receptacle 1 which may be used in a beverage preparation system as described in WO2010/026053. The device for sensing the capsule 2 of the invention is specially designed to be adapted to a rotary receptacle 1 exerting centrifugal forces on ingredient inside the capsule 2.

The receptacle 1 forms in general a cylindrical or conical wide shaped cavity provided with an upper opening for inserting the capsule 2 and a lower bottom closing the receptacle. The opening has a diameter slightly larger than the one of the body of the capsule 2. The outline of the opening fits to the outline of a rim of the capsule configured to lean on the edge of the opening when the capsule 2 is inserted. The lower bottom is provided with a cylindrical hollow shaft 3 attached perpendicularly to the center of the external face of the bottom. The receptacle 1 rotates around the central axis R of the hollow shaft 3. The inner face of the bottom of the receptacle includes a hole at its center communicating with the interior of the shaft 3.

The mechanical part of the sensing device of the invention comprises a rod 4 passing through the hole at the center of the receptacle 1 and sliding in the shaft 3. The rod 4 is maintained lifted inside the receptacle 1 thanks to a spring 8 arranged between a fixed point in the shaft 3 and the end of the rod 4 appearing in the receptacle 1. Depending on the size of the capsule, the rod 4 is more or less pushed into the shaft 3 and the spring 8 more or less compressed by the bottom of the capsule 2 when inserted in place in the receptacle.

When capsule 2 is not in arranged in the receptacle 1, the rod 4 is at a neutral position i.e. the spring 8 is entirely released without any force pushing the rod 4. The position of the end of the rod in the shaft 3 is thus close to the bottom of the receptacle 1 while the other end is close to the opening.

The arrangement of the capsule in the receptacle requires that a pressure is exerted onto the capsule which is obtained in particular by physically applying a liquid feed assembly (not shown) of the brewing apparatus against the upper surface of the capsule such as described in WO2010/026053. The liquid feed assembly comprises a surface that applies a certain closure pressure onto the upper surface of the capsule. As a result, the capsule 2 pushes the rod 4 so that the rim of the capsule 2 leans on the whole outline of the upper edge of the receptacle 1.

FIGS. 1 to 4 illustrate an example of a mechanical realization of the rod 4 associated to some mechanical elements enabling its motion according to the size of the capsule in the receptacle 1.

The rod 4 is formed by a piece of metallic or plastic tube sliding on a core piece 5 fixed with the shaft 3 of the receptacle 1. The diameter of the core piece 5 is determined so that the tube can slide freely inside the shaft 3 between the internal wall of the shaft 3 and the external surface of the core piece 5. The first end of the tube which is situated inside the receptacle is closed by a free end 10 which external face enters in contact with the bottom of the capsule when inserted in the receptacle. The second end of the tube is provided with at least one member 6 traversing a slot 7 made in the shaft 3. For balance reasons when rotating, the second end of the tube is provided with at minimum two symmetrically arranged members 6 and the shaft 3 includes corresponding slots 7 also symmetrically arranged around the external surface of the shaft 3.

For reasons linked to the manufacturing process facility and costs, mechanical components such as the shaft, the rod, the core piece, the spring are preferably made on a cylindrical based shape.

The main role of the member 6 is to make visible from outside, by the measuring means, the position of the end of the rod 4 according to the size or to the presence of the capsule 2 in the receptacle 1. Another role is to prevent the disengagement of the rod 4 out of the shaft 3 when pulled from the receptacle 1. The member 6 abuts against the upper edge of the slot 7 when the rod 4 is at the highest position with the spring 8 released.

The spring 8 is arranged inside the tube between the free end 10 and the end of the core piece 5 inside the shaft 3, the core piece 5 being the fixed support point of the spring 8. The other end of the core piece 5 closes the end of the shaft 3 and forms a coupling piece 9 for attaching a shaft (not illustrated) of a motor enabling the rotation of the receptacle 1.

It has to be noted that each mechanical component of the capsule sensing device may be either made up individually of metal or plastic material, i.e. for example when the core piece is metallic, the tube of the rod may be in plastic material or vice versa.

The measuring means 11 of the position of the rod 4 are based on optical reading or magnetic sensing of the end of the rod 4 sliding in the shaft 3:

Optical Measuring Means:

The position of the end of the rod 3 is read by an optical sensor 12 acting on the member(s) 6 traversing the slot(s) 7 of the shaft 3. A light beam 13 is projected towards the member(s) 6 with light sources 14 positioned at different heights along the shaft 3. The visible external parts of the members 6 are provided with surfaces on which the light beam 13 is reflected towards cells of a light sensor 15 which provides an electrical signal when receiving a reflected light beam. For each position of the rod 4 given by a small, medium, or a large capsule 2 corresponds an optical sensor 12 comprising a light source 14 and a light sensor 15.

The optical sensor 12 consists of a light source 14 with or without focusing optic and a light sensor 15 with or without focusing optic. The light source 14 emits either incoherent or coherent (laser) light. The light spectrum may be any, but preferably selected in the infra red band.

Figure 2:
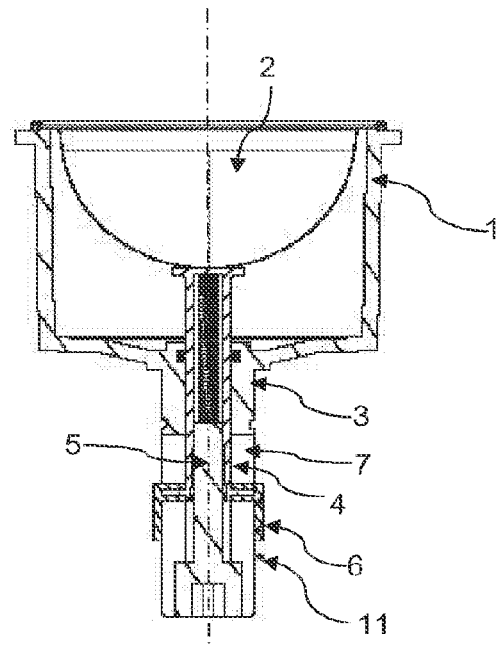
FIG. 2 shows a receptacle containing a medium size capsule where the rod of the device for sensing the capsule is at a median position inside the receptacle.
Figure 3:
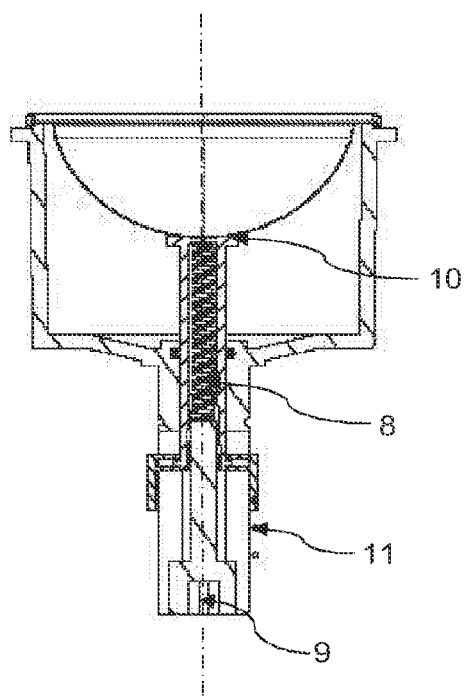
FIG. 3 shows a receptacle containing a small size capsule where the rod of the device for sensing the capsule is at a high position inside the receptacle.
Figure 4:
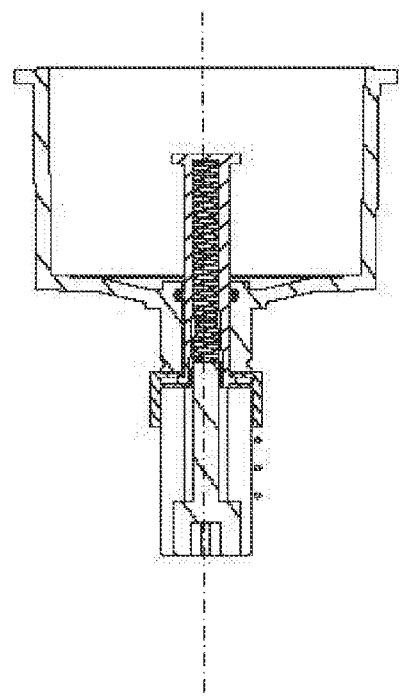
FIG. 4 shows an empty receptacle where the rod of the device for sensing the capsule is at a neutral position inside the receptacle.

FIG. 5 shows a schematic view of optical sensors 12 positioned for the three sizes of capsules 2 illustrated by FIGS. 1 to 3. The light beam 13 emitted by a light source 14 of an optical sensor 12 is either reflected on the external surface of the member 6 traversing the slot 7 or absorbed by the external surface of the rod 4 or by the external surface of the core piece 5 inside the shaft 3. The corresponding light sensor 15 provides a binary bit "0" or "1" in respect of reflection or absorption of the light beam 13.

The surfaces entering in contact with light beams are treated in by appropriate material for absorbing or reflecting light in the most optimal conditions. According to the example of FIG. 5, a medium size capsule provides binary code "010", a large size provides "001" and a small size provides "100". When the capsule 2 is not inserted in the receptacle 1, the member 6 of the rod 4 is at the highest position out of the space monitored by the sensors 12. The light beams 13 are thus all absorbed by the core piece 5 inside the shaft so that the sensors 15 provide binary code "000". The bits of the code may also be inverted in a configuration of the sensors 15 where a reflection provides bit "0" while absorption provides bit "1".

This binary code is transmitted to a control device of the beverage production apparatus managing machine parameters by taking in account the size of the capsules. These parameters are for example the quantity of water, the water temperature, pressure, flow rate of water supplied, and also the rotating speed of the receptacle, etc.

According to an embodiment shown by FIG. 6, the optical reading of the position of the rod 4 may be based on light barriers principle where a light source 14 is placed facing a light sensor 15. For the three sizes of capsules, three pairs of light source and light sensor are required. The light sources 14 facing the light sensors 15 are placed at the levels corresponding to the positions of the member 6 in the vicinity of the shaft 3. The geometry of the member 6 as well as the location of the light sensors 15 and the light sources 14 in the vicinity of the shaft 3 are adapted to interrupt or not the light beam 13 in function of the size of the capsule 2 depending on the position of the rod 3.

The FIG. 6 shows an example with a position of the rod 3 given by a medium size capsule. In this case the light beam 13 illuminates the lowest and the highest light sensor 15 while the sensor at the intermediate position is occulted by the member 6 of the rod 3. A medium size capsule 2 provides thus binary code "101", a large size provides code "110" and a small size provides code "011". When the capsule 2 is removed from the receptacle 1, the rod 3 is at its highest position so that all sensors 15 are illuminated by their respective light beams 13, providing thus code "111". As in the preceding embodiment, the bits of the code may be inversed so that an illuminated sensor 15 provides bit "0" while an occulted one provides bit "1".

According to a further embodiment shown on FIG. 7, a portion of the shaft 3 may be made up of transparent plastic material to make visible to an optical sensor 12 the end of the rod 4 sliding inside the shaft 3. Slots for passing members of the rod are therefore no more necessary in the shaft. They are then replaced by abutments 17 on the inner wall of the shaft 3 configured for preventing disengagement of the rod 4. The abutments 17 are placed at a distance from the end of the core piece 5 closing the shaft 3 determined by the highest position of the rod 4, i.e. the position of the rod 4 when the capsule 2 is removed from the receptacle 1. The member 6 at the end of the rod 7 sliding in the shaft 3 is thus dimensioned according to the shape and dimensions of the abutments 17 inside the shaft 3.

In a configuration example, the core piece 5 is coated with a dark light absorbing color and the tube of the rod 4 coated in a light reflective color or vice versa to provide suitable contrast for reading the position of the rod 4 through the transparent wall of the shaft 3. In another embodiment the coating of the rod 4 may cover only an end part of the rod 4 while the remaining part is coated with dark color. For both configurations, the position of the rod 4 is read by optical sensors 12 similar to the ones used in the embodiment of FIG. 5. The light sources 14 and the light sensors 15 are therefore placed in the vicinity of the transparent portion of the shaft 3.

In the example of FIG. 7, the rod 4 is entirely light reflective and the core piece 5 light absorbent. A medium size capsule 2 provides binary code "110", a large size provides code "111" and a small size provides code "100". When the capsule 2 is removed code "000" is provided because the position of the rod 4 is out of the space monitored by the optical sensors 12. The light beams 13 are therefore all absorbed by the core piece 5. As in the preceding embodiments, the bits of the code may be inverted in a configuration of the sensor where a reflection provides bit "0" while absorption provides bit "1".

In a further embodiment, the transparent portion of the shaft 3 may be replaced by one or a plurality of slots configured to render visible, by the optical sensor 12, the end of the rod 4 sliding in the shaft 3.

Figure 9:
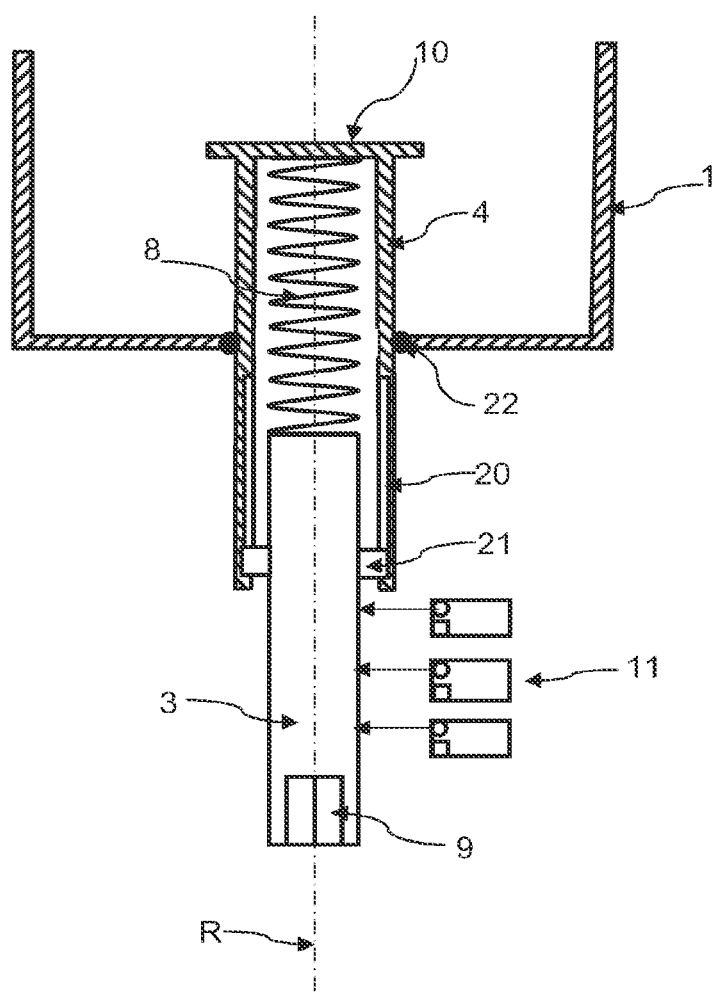
FIG. 9 shows an embodiment of the device where the rod slides over the shaft which is not attached to the receptacle, the optical sensing means being based on reflection/absorption of a light beam on the rod and on the shaft.

In a further embodiment illustrated by FIG. 9, the shaft 3 is not attached to the receptacle 1 which rotation is enabled by the rod 4 driven by the shaft 3 via the coupling piece 9 which is attached to a shaft of a motor.

The rod 4 made up of a tube traverses the receptacle 1 through a hole at the center of the bottom of the receptacle 1 and slides over the shaft 3 coaxial to the rod 4 and to the rotation axis R.

The shape of the hole as well as the shape of the section of the rod 4 traversing the hole may be oval or any other shape suitable to drive the rotation of the receptacle 1 around the axis R. The water tightness between the exterior and the interior of the receptacle 1 is provided with a joint 22 such as an O-ring having an outline corresponding to the one of the hole. The spring 8 maintaining the end of the rod 4 inside the receptacle is located between the end of the shaft 3 and the free end 10 of the rod 4. The coupling between the shaft 3 and the rod 4 is made up of at least one pin 21 sliding in a groove 20 on the inner wall of the rod 4. The length of the groove 20 is determined by the distance covered by the rod 4 between its highest position in absence of a capsule in the receptacle and its lowest position reached when the maximal size of capsule is inserted in the receptacle 1. The lower end of the groove 20 provides an abutment preventing the disengagement of the shaft 3 from the rod 4 by pulling it from the receptacle 1. For reasons related to balance when rotating, two or more pins 21 with corresponding grooves 20 in the rod 4 are symmetrically distributed around the shaft 3 respectively in the rod 4.

FIG. 9 shows an example where the rod 4 is at its highest position and the spring 8 is entirely released in absence of a capsule in the receptacle 1. The position of the end of the rod 4 is read by optical sensors 11 as in the embodiments of FIG. 5 or FIG. 7. The contrast between the shaft 3 and the rod 4 may be improved by an appropriate coating, i.e. the rod 4 is coated with light reflective material while the shaft 3 is coated with light absorbent material or vice-versa.

In a further embodiment the optical sensors are replaced by a magnetic sensor using a permanent magnet controlling switches sealed in small watertight glass tubes (reed relays).

The magnetic sensors consist of reed relay switches 19 arranged at positions along the shaft 3 corresponding to the different capsule sizes. The switches 19 are operated by the permanent magnet 18 attached to the end of the rod 4 sliding in the shaft 3 in respect to the size of the capsule 2 inserted in the receptacle 1 or the absence of capsule.

As shown by FIG. 8, a permanent magnet 18 is arranged on the end of the rod 4 sliding in the shaft 3. The magnet 18 may be configured in form of an end piece or a ring surrounding the end of the rod 4. This magnet 18 may also be used as member to enter in contact with abutments 17 on the inner wall of the shaft 3 configured for preventing disengagement of the rod 4. As in the embodiment with the transparent shaft of FIG. 7, no slots in the shaft are necessary because the magnetic field traverses non-magnetic materials without being absorbed or deviated. Therefore, in this embodiment, the tube of the rod 4, the shaft 3 and the core piece 5 have to be made in non-magnetic material such as aluminum, brass or plastic material.

The magnetic field of the permanent magnet traverses the shaft 3 and opens or closes the reed relay switches 19. These switches 19 are placed in an electric circuit connected to the control device of the apparatus and configured to provide a binary code in respect of the position of the magnet 18 at the end of the rod 4 sliding inside the shaft 3.

In the example of FIG. 8, the medium size capsule positions the magnet 18 facing the intermediate switch 19 that is closed by the action of the magnetic field. The upper and the lower switch 19 remain open.

A medium size capsule 2 provides code "010", a large size provides code "001" and a small size provides code "100". When the capsule 2 is removed code "000" is provided because the position of the magnet 18 is beyond the highest switch 19 which is then open as the two lower ones. The bits of the code may also be inverted in a configuration of the magnetic sensor where a closed switch provides bit "0" while an open switch provides bit "1".

An advantage of this embodiment, in addition to simplicity, is that the electric consumption is reduced relative to the embodiments with optical sensors requiring electrical power supply for the light source and the light sensors.

Although the device has been more particularly described in relation to a beverage production device using centrifugation for extracting liquid from the capsule, it can be part of a beverage production device using pressure by a separate pump or gravity for extracting liquid and in which the receptacle is not rotated around an axis perpendicular to the center of the bottom of the receptacle.

The invention claimed is:

1. A device for sensing a capsule containing a beverage ingredient in a beverage production apparatus, the device comprising:
   a receptacle configured to receive the capsule;
   a sensing member configured to sense the presence of different sizes of capsules in the receptacle, the sensing member comprises a movable component configured to move between positions that correspond to the different sizes of the capsule, and the movable component is positioned at least partially within the receptacle in at least one of the positions; and
   a coding member at least partially located on the movable component, and configured to detect a position of the movable component and provide different codes based on the position of the movable component, the different codes each correspond to one of the different sizes of capsules sensed by the sensing member.

2. The device of claim 1, wherein the coding member provides the different codes based on a distance that the movable component extends into the receptacle.

3. The device of claim 1, wherein the movable component is positioned at least partially within a shaft that rotates the receptacle.

4. The device of claim 3, wherein the sensing member comprises magnetic sensors arranged along the shaft, and the coding member provides the different codes based on opening and closing of switches in the magnetic sensors.

5. The device of claim 1, wherein the movable component slides on a central axis of the receptacle, and the sensing member comprises an optical sensor comprising a light source that emits a light beam toward the central axis.

6. The device of claim 5, wherein the optical sensor comprises light sensors, and the coding member provides the different codes based on the light sensors activated by the light beam.

7. A beverage production apparatus comprising a device for sensing a capsule containing a beverage ingredient in the beverage production apparatus, the device comprising:
   a receptacle configured to receive the capsule;
   a sensing member configured to sense the presence of different sizes of capsules in the receptacle, the sensing member comprises a movable component configured to move between positions that correspond to the different sizes of the capsule, and the movable component is positioned at least partially within the receptacle in at least one of the positions; and
   a coding member at least partially located on the movable component, and configured to detect a position of the movable component and provide different codes based on the position of the movable component, the different codes each correspond to one of the different sizes of capsules sensed by the sensing member.

8. The beverage production apparatus of claim 7, wherein the coding member provides the different codes based on a distance that the movable component of the sensing member extends into the receptacle.

9. The beverage production apparatus of claim 7, wherein the sensing member comprises magnetic sensors, and the coding member provides the different codes based on opening and closing of switches in the magnetic sensors by the movable component.

10. The beverage production apparatus of claim 7, wherein the movable component is at least partially positioned on a central axis of the receptacle, and the sensing member comprises an optical sensor comprising a light source that emits a light beam toward the central axis.

11. The beverage production apparatus of claim 10, wherein the optical sensor comprises light sensors, and the coding member provides the different codes based on the light sensors blocked or unblocked by the movable component.

* * * * *